United States Patent [19]
Hansen

[11] 3,796,511
[45] Mar. 12, 1974

[54] BLOWER

[75] Inventor: Russell D. Hansen, Fontanelle, Iowa

[73] Assignee: Frigidraulic, Inc., Anita, Iowa

[22] Filed: June 15, 1972

[21] Appl. No.: 263,270

[52] U.S. Cl............... 415/144, 55/394, 55/DIG. 40, 415/206
[51] Int. Cl.................. F04d 17/18, B01d 17/00
[58] Field of Search............ 55/394, 397, 398, 400, 55/406, DIG. 40; 415/53, 168, 206, 144

[56] References Cited
UNITED STATES PATENTS

| | | | |
|---|---|---|---|
| 627,575 | 6/1899 | Day | 55/397 |
| 1,215,881 | 2/1917 | Siemen | 415/168 |
| 2,289,474 | 7/1942 | Anderson | 415/206 |

FOREIGN PATENTS OR APPLICATIONS

| | | | |
|---|---|---|---|
| 257,121 | 8/1926 | Great Britain | 415/206 |
| 345,120 | 3/1931 | Great Britain | 55/397 |

Primary Examiner—Henry F. Raduazo
Attorney, Agent, or Firm—Zarley, McKee and Thomte

[57] ABSTRACT

A blower is comprised of a substantially cylindrical housing having end walls and an arcuate wall forming a substantially cylindrical chamber. A discharge opening is formed in the arctuate wall and an intake opening is formed in at least one of the end walls. A cylindrical fan rotor is rotatably mounted within the chamber for drawing air into the chamber through the intake opening and for propelling it around the interior of the chamber and outwardly through the discharge opening. There is a slot in the arcuate wall adjacent the discharge opening, and a skinning member protrudes radially inwardly adjacent the slot for directing a thin layer of air adjacent the arcuate wall of the chamber outwardly through the slot so as to remove dust particles adjacent the outer peripheral edge of the housing wall.

9 Claims, 4 Drawing Figures

PATENTED MAR 12 1974  3,796,511

BLOWER

This invention relates generally to blowers and particularly to a blower having means thereon for removing dust particles from the air being blown.

A problem encountered with blowers on farm equipment and also on other types of ventilation equipment, is the removal of dust being blown through the ventilating system. Most systems utilize filters which are expensive and which greatly hinder the efficiency of the blower. Furthermore, such filters must be periodically cleaned or replaced.

The present invention provides means for removing dust particles from the air without the need of filters and in a simple and economical way.

Therefore a primary object of the present invention is the provision of a blower which removes dust and other particles from the air before discharging the air into a ventilation system.

A further object of the present invention is the provision of a blower which does not require complicated filtering systems.

A further object of the present invention is the provision of a blower having means for removing dust particles which is self-cleaning A further object of the present invention is the provision of a blower which separates the dirt particles and peels off the dirt-ridden air within the blower without substantially reducing the volume of air exiting from the blower.

A further object of the present invention is the provision of a blower which is simple in construction, economical to manufacture, and durable in use.

This invention consists in the construction, arrangements, and combination of the various parts of the device, whereby the objects contemplated are attained as hereinafter more fully set forth, especially pointed out in the claims, and illustrated in the accompanying drawings in which:

Figure 1:
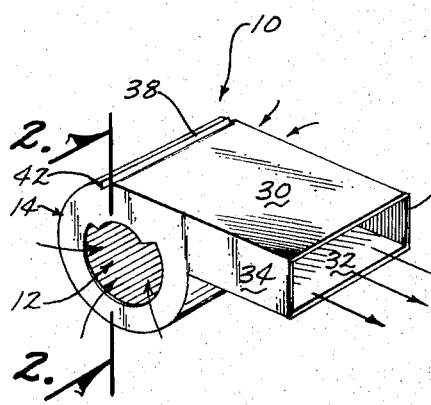
FIG. 1 is a perspective view of the blower of the present invention
Figure 2:
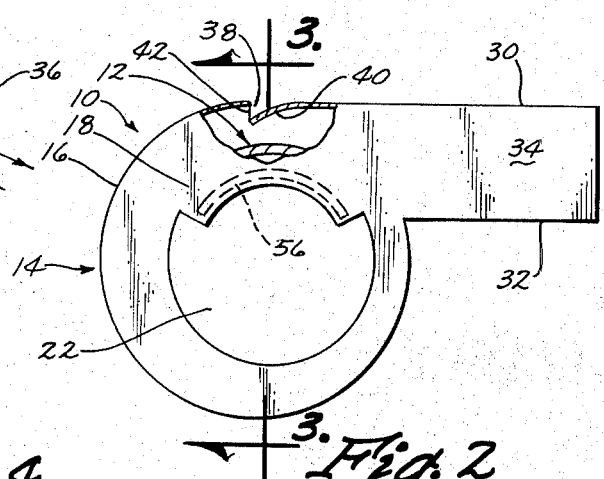
FIG. 2 is a sectional view taken along line 2 — 2 of FIG. 1.
Figure 3:
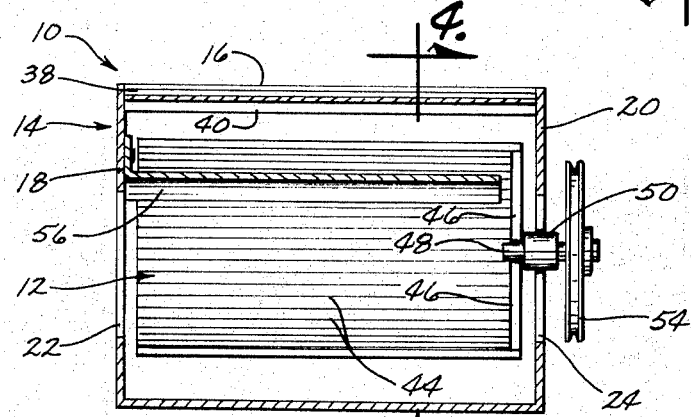
FIG. 3 is a sectional view taken along line 3 — 3 of FIG. 2.
Figure 4:
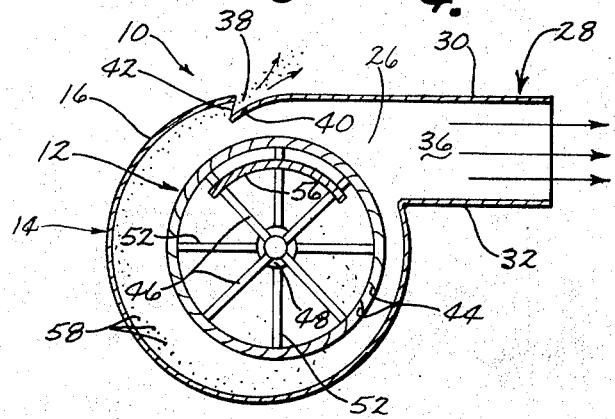
FIG. 4 is a sectional view taken along line 4 — 4 of FIG. 3.

Referring to the drawings, a blower 10 includes a rotor 12 rotatably mounted within a housing 14. Housing 14 includes a cylindrical wall 16 which is joined at its opposite ends by end walls 18 and 20. End wall 18 is provided with an inlet opening 22 and end wall 20 is provided with an inlet opening 24 (FIG. 3) for permitting air to be drawn within the housing. A discharge opening 26 is provided in cylindrical wall 16 for permitting air to exit from the interior of housing 14. Discharge opening 26 is provided with a discharge spout 28 having an upper wall 30, a lower wall 32, and two lateral side walls 34, 36. Upper wall 30 is substantially a tangential continuation of cylindrical wall 16 of housing 14. Extending transversely across the top of cylindrical wall 16 is an elongated slot 38. Slot 38 is very narrow in comparison to the width of discharge opening 26. Slot 38 is formed by an inwardly protruding skimming member 40. Member 40 is arcuate and extends radially inwardly and away from discharge opening 26. Skimming member 40 thus forms a smooth continuous path for deflecting a thin layer of air traveling around the inner surface of cylindrical wall 16 outwardly through slot 38. Slot 38 forms V-notches 42 in end walls 18, 20 of housing 14 as is shown in FIGS. 1, 2 and 4. The depth to which skimming member 40 protrudes within the chamber formed by housing 14, is comparatively small with respect to the diameter of housing 14. Thus skimming member 40 peels off only a very thin layer of air which is directly adjacent the interior surface of arcuate cylindrical wall 16.

Rotor 12 includes a circular array of fan blades 44 which form a cylindrical wall in squirrel-cage fashion. At the right end of rotor 12, as viewed in FIG. 3, are a plurality of radial spokes 46 which extend radially inwardly from blades 44 and which are secured to a hub 48. Hub 48 is rotatably journaled in a bearing sleeve 50 which is rigidly mounted to housing 14 by means of spokes 52 (FIG. 4). A pulley 54 is mounted on the outer end of hub 48 and is adapted to be rotated by belt drive in conventional fashion.

Rotor 12 is open ended at its left end as viewed in FIG. 3. Protruding within the opened end of rotor 12 is a baffle plate 56 which is rigidly secured to end wall 18 of housing 14. As seen in FIGS. 2 and 4, baffle plate 56 is arcuate, and extends approximately 90 degrees around the circumference of the interior of rotor 12. Baffle plate 56 is also located adjacent the inner surface of the circle formed by blades 44 of rotor 12.

In operation, rotor 12 is rotated in a clockwise direction as viewed in FIGS. 2 and 4. The rotation of rotor 12 causes air to be drawn into openings 22, 24 and to be centrifugally forced outwardly through blades 44 into the space between blades 44 and arcuate wall 16 of housing 14. Baffle plate 56 prevents air from being driven directly outwardly through blades 44 and outwardly through slot 38 and discharge opening 36. Instead this air is directed to the space between rotor 12 and arcuate cylindrical wall 16 and propelled in a circular direction around the interior of arcuate wall 16. Any dust which happens to be in the air thus propelled, is driven by centrifugal force radially outwardly to a point adjacent the interior surface of arcuate wall 16. By the time the dust particles (designated 58 in FIG. 4) reach slot 38, they are driven by centrifugal force into a thin film which is adjacent the interior surface of arcuate wall 16. Skimming member 40 causes this film of dust particles to be deflected outwardly through slot 38 and thus to be separated from the remainder of the air being driven outwardly through discharge opening 26. Thus the air exiting from discharge opening 26 is substantially free from dust particles.

The slot 38 and skimming member 40 permit the removal of dust particles without the use of a filter system. Furthermore, this dust removal system is self-cleaning and requires no maintenance or repair as with conventional filtering devices. Skimming member 40 protrudes inwardly only a short distance in comparison to the total distance between cylindrical wall 16 and rotor 12, and therefore does not skim off a substantial amount of air from the main flow of air. Therefore, it deflects a neglibible amount of air from the main stream of air which is exiting from discharge opening 26. Even though slot 38 removes a very small portion of air compared to the total amount of air being moved, the air which actually exits from slot 38 contains most of the dirt and dust particles. Thus it can be seen that the device accomplishes at least all of its stated objectives.

I claim:

1. A blower comprising
a substantially cylindrical housing having end walls and an arcuate wall forming a substantially cylindrical chamber;
a discharge opening formed in said arcuate wall;
an intake opening formed in at least one of said end walls;
a cylindrical fan rotor rotatably mounted within said chamber for drawing air into said chamber through said intake opening and for propelling it around the interior of said cylindrical chamber and outwardly through said discharge opening, said rotor having an outer cylindrical surface in inward spaced relation to said arcuate wall of said housing and generally comprising an open space surrounded by a cylindrical wall of fan blade elements,
a baffle plate being rigidly connected to said housing and protuding within said open space in said rotor, said baffle plate being positioned to prevent direct passage of air from said open space radially outwardly toward said slot;
a slot in said arcuate wall adjacent said discharge opening;
a skimming member protruding radially inwardly adjacent said slot for directing a thin layer of air adjacent said arcuate wall outwardly through said slot, whereby the majority of the air being blown by said fan rotor bypasses said slot and exits through said discharge opening.

2. A blower according to claim 1 wherein said slot and said skimming member extend transversely across said housingg from one of said end walls to the other of said end walls.

3. A blower according to claim 2 wherein said skimming member protrudes radially inwardly to a point less than half the distance from said arcuate wall to said outer cylindrical surface of said rotor.

4. A blower according to claim 3 wherein said baffle plate is arcuate and is concentric to said cylindrical wall of fan blade elements.

5. A blower according to claim 4 wherein said baffle plate is adjacent and spaced from said wall of fan blade elements.

6. A blower according to claim 1 wherein said rotor rotates about a rotational axis which is offset with respect to the cylindrical axis of said cylindrical housing.

7. A blower according to claim 1 wherein said skimming member is arcuate and protrudes tangentially inwardly from said arcuate wall in a circumferential direction opposite from the rotational direction of said rotor whereby said skimming member provides a smooth continuous path for said thin layer of air as said thin layer of air is directed outwardly through said slot.

8. A blower according to claim 1 wherein the baffle plates extend around less tha 180° of the circumference of the interior of the rotor.

9. A blower according to claim 8 wherein the baffle plates extend around about 90° of the circumference of the interior of the rotor.

* * * * *